(12) United States Patent
Marsala et al.

(10) Patent No.: US 9,651,700 B2
(45) Date of Patent: May 16, 2017

(54) MAPPING RESISTIVITY DISTRIBUTION WITHIN THE EARTH

(71) Applicants: Saudi Arabian Oil Company, Dhahran (SA); Groundmetrics, Inc., San Diego, CA (US)

(72) Inventors: Alberto Marsala, Bergamo (IT); Andrew Dennis Hibbs, LaJolla, CA (US); Todor Petrov, Santee, CA (US)

(73) Assignees: Saudi Arabian Oil Company, Dhahran (SA); Groundmetrics, Inc., San Diego, CA (US)

( * ) Notice: Subject to any disclaimer, the term of this patent is extended or adjusted under 35 U.S.C. 154(b) by 64 days.

(21) Appl. No.: 14/013,579

(22) Filed: Aug. 29, 2013

(65) Prior Publication Data
US 2015/0061683 A1   Mar. 5, 2015

(51) Int. Cl.
*G01V 3/26*  (2006.01)
*G01V 3/08*  (2006.01)
(Continued)

(52) U.S. Cl.
CPC ............... *G01V 3/08* (2013.01); *E21B 47/00* (2013.01); *G01V 3/18* (2013.01); *G01V 3/30* (2013.01); *G01V 3/38* (2013.01)

(58) Field of Classification Search
CPC ........ E21B 47/00; E21B 47/122; E21B 47/12; G01V 3/26; G01V 3/38; G01V 1/40;
(Continued)

(56) References Cited

U.S. PATENT DOCUMENTS 2,708,261 A    5/1955  Thompson
4,757,262 A *  7/1988  Bostick, Jr. ............ G01V 3/087
                                                  324/345
(Continued)

OTHER PUBLICATIONS

Marsala et al., "First Borehole to Surface Electromagnetic Survey in KSA: reservoir mapping & monitoring at a new scale", SPE Annual Technical Conference and Exhibition held in Denver, Colorado, Oct. 30-Nov. 2, 2011, pp. 1-10, SPE 146348.
(Continued)

*Primary Examiner* — Son Le
*Assistant Examiner* — Akm Zakaria
(74) *Attorney, Agent, or Firm* — Bracewell LLP; Constance G. Rhebergen; Albert B. Kimball, Jr.

(57) ABSTRACT

Resistivity in subsurface earth at locations kilometers away from wells in the reservoirs is mapped and monitored. An electromagnetic source with an electrode is deployed a borehole in the reservoir, and a group of sensors at counter electrodes is deployed at a number of other locations radially spaced at some distance from the well. The source transmits a current which flows to the counter electrodes causing an electromagnetic field which is sensed at the sensors. The source is activated at different depths in the well and ratios of the electromagnetic field sensed with the source at different depths used to obtain data to map the resistivity. The sensors are capable of sensing electromagnetic fields along two orthogonal axes, and the measurements at a sensor along these axes used to reduce undesirable effects of noise and other factors on the data measurements.

12 Claims, 3 Drawing Sheets

(51) Int. Cl.
*E21B 47/00* (2012.01)
*G01V 3/30* (2006.01)
*G01V 3/18* (2006.01)
*G01V 3/38* (2006.01)

(58) Field of Classification Search
CPC ... G01V 3/00; G01V 3/02; G01V 3/08; G01V 3/34; G01N 2291/02863; G01N 27/82; G01N 33/0031; G01R 27/08
USPC ......... 324/355, 67, 134, 135, 136, 138, 139, 324/140, 150, 160, 170, 180, 200, 800, 324/336–339; 702/7, 6
See application file for complete search history.

(56) References Cited

U.S. PATENT DOCUMENTS

| | | | | |
|---|---|---|---|---|
| 4,875,015 A | * | 10/1989 | Ward | G01V 3/26 324/323 |
| 5,469,062 A | * | 11/1995 | Meyer, Jr. | G01V 3/30 324/338 |
| H001524 H | * | 4/1996 | Thompson | G01V 1/181 324/323 |
| 5,955,884 A | * | 9/1999 | Payton | G01V 3/26 324/339 |
| 7,565,244 B2 | | 7/2009 | Alumbaugh et al. | |
| 7,991,553 B2 | | 8/2011 | Alumbaugh et al. | |
| 2005/0068850 A1 | * | 3/2005 | Muyzert | G01V 1/286 367/38 |
| 2007/0188742 A1 | * | 8/2007 | Gunsaulis | E21B 7/046 356/138 |
| 2009/0005992 A1 | * | 1/2009 | Alumbaugh | G01V 3/30 702/7 |
| 2009/0005993 A1 | | 1/2009 | Abubakar et al. | |
| 2010/0259267 A1 | * | 10/2010 | Rosthal | G01V 3/30 324/339 |
| 2010/0259268 A1 | * | 10/2010 | Zhang | G01V 3/28 324/339 |
| 2010/0277177 A1 | * | 11/2010 | Alumbaugh | G01V 3/38 324/338 |
| 2010/0286915 A1 | | 11/2010 | Fincher et al. | |
| 2010/0305863 A1 | * | 12/2010 | Abubakar | G01V 11/00 702/7 |
| 2012/0293179 A1 | | 11/2012 | Colombo et al. | |

OTHER PUBLICATIONS

Partial International Search Report for related PCT application PCT/US2014/049527 dated May 12, 2015.
International Search Report and Written Opinion for related PCT application PCT/US2014/049527 dated Jul. 21, 2015.

* cited by examiner

MAPPING RESISTIVITY DISTRIBUTION WITHIN THE EARTH

BACKGROUND OF THE INVENTION

1. Field of the Invention

The present invention relates to measuring and mapping the electrical resistivity of the earth's subsurface with measurements from transmission of electrical energy from wells in subsurface reservoirs to remote electrodes.

2. Description of the Related Art

Electromagnetic (EM) soundings probe electrical resistivity (or its inverse, conductivity) as a function of lateral position and depth in the earth. Resistivity data from EM soundings are obtained in surveys over regions of interest and used to obtain information about subsurface geological structures and/or man-made objects of interest. These include, for example, mineral deposits, hydrocarbon reservoirs, Enhanced-Oil-Recovery/Improved-Oil-Recovery injected fluids and in-situ fluids, hydrofracturing injected fluids and slurries, groundwater reservoirs, fluid fronts, contaminants, permafrost, weathered layers, infrastructure, tunnels, and underground facilities. Since the resistivities of such objects and the surrounding media are generally quite dissimilar, they can, in theory, be discriminated by means of measurement of the subsurface resistivity. Using this methodology, the depth, thickness, and lateral extent of objects of interest can be determined, depending on the capabilities of naturally occurring EM sources, or controlled-source EM sources such as a transmitter.

A number of measurement scenarios for sounding have been employed in the past, including natural and/or controlled electric and/or magnetic sources with many different source and/or receiver combinations and/or geometries for surface-based configurations, borehole-to-surface configurations, surface-to-borehole configurations, single borehole configurations, and multiple borehole (e.g., cross-borehole) configurations. Recently, the borehole-to-surface configuration, with a controlled electromagnetic field source at a desired depth in a borehole and an array of electromagnetic receivers at the ground surface, has been demonstrated to have adequate sensitivity to map the boundary of a hydrocarbon reservoir to a distance of 2 km-3 km from a borehole.

Controlled-source EM methods include both frequency-domain and time-domain measurements of the fields in response to artificially generated EM fields. In time-domain EM surveys routinely practiced by industry, an antenna measures magnetic fields generated from subsurface currents induced in the earth. In induced polarization (IP) or spectral induced polarization (SIP) surveys routinely practiced by industry, an array of receiver electrodes measures voltage and/or electric fields generated from subsurface currents induced in the earth. In magnetic induced polarization (MIP) or magnetometric resistivity (MMR) or sub-audio magnetic (SAM) surveys routinely practiced by industry, an array of receiver electrodes measures voltage and/or electric fields generated from subsurface currents induced in the earth. In controlled-source audio-magnetotelluric (CSAMT) or controlled-source magnetotelluric (CSMT) surveys routinely practiced by industry, an array of receiver electrodes measures voltage and/or electric fields and an array of receiver magnetometers measures magnetic fields generated from subsurface currents induced in the earth. In all of these methods the currents are induced in the earth by a time-varying electromagnetic field. When the source is located in a well borehole and sensors or receivers are at the surface, these types of surveys are known as borehole to surface electromagnetic or BSEM surveys.

In BSEM surveys, each EM receiver measures the EM field at the ground surface produced by the EM source at depth in the borehole. The source field propagates through the earth in a manner that depends on the electrical resistivity distribution within the earth. Measurements of the EM field at multiple points on the surface can be processed using a number of conventional methods, known in the art, to produce a three-dimensional map of the resistivity distribution in the subsurface region covered by the receiver array.

Present BSEM surveys employ an array of 1000 or more measurement points. For electric field receivers, two electrodes placed 10 m to 100 m apart are needed for each axis of measurement. Installing such electrodes requires accurate geolocation of 2000 or more physical sites for a single measurement axis, for example the electric field radial to the borehole, and further geolocation is necessary when additional axes, for example the tangential field, are desired. Furthermore, conventional electrodes used for electric field surveys require burial at depths of order 50 cm. For magnetic field receivers only a single unit is needed for each axis of measurement, but the hole required for burial is 3 to 5 times larger than needed for an electrode used for electric field sensing. Recently, an electric field sensor that does not require burial, but can simply be placed on the surface of the ground, has been introduced. However, two sensors are still required for each axis of measurement, and each sensor requires accurate geolocation.

Accurate geolocation is required to establish the position of each sensor within the sensor array and also to ensure correct alignment of the sensor axes. An absolute position accuracy of 1 m results in a location error of order 0.1% in an array of scale 1 $k_m$. However over a 50 m separation between electrodes, a position error of 1 m results in an angular error of order 5%, which in turn results in an error of order 5% in measuring the electric field.

A second source of measurement error is a variation in the electrical contact impedance between the electrode and the earth. For example a change of 10 kΩ in the contact impedance results in a change in the measured signal of order 0.1%. A third source of error in measuring the E-field in the ground is the static shift effect that is due to inhomogeneities in the ground conductivity that occur very close to the sensor. Fourthly, the signal at the ground surface can be affected by the local roughness of the ground and variations in elevation. To address these measurement issues, careful, time consuming installation of the EM sensors is required.

Even when the best installation methods have been employed, the four sources of error associated with the receivers have in general limited the accuracy of the field measured at any point. In particular, if a BSEM survey is repeated at a later time at the same site, then variations in installing the sensors are likely to be the limiting factor in the determining if differences in the subsurface have developed in the time between the two surveys. Permanent installation of sensors addresses geolocation and alignment issues, but is still vulnerable to changes in coupling, static shift and surface features that may occur due to changes in weather conditions.

The accuracy problems mentioned above have significantly affected the time needed to install a surface sensor array. A further factor in the time needed to complete a BSEM survey is the local EM interference at the site. This interference, also known as cultural noise, is usually man-made and is produced by power lines and electrical equipment in the vicinity of the survey location. The cultural noise can vary across a survey array making it difficult to remove it by processing in the final data.

The installation and interference issues in part set the limits of present EM methods in geophysics. By virtue of the source being located below ground, it becomes possible to consider applying BSEM to deeper subsurface formations with higher spatial resolution than are targeted by traditional EM soundings that use a surface source. However, as a result the requirements for receiver accuracy are increased over those for traditional EM surveys.

In addition to the time needed to install the receivers at the surface, there is the time needed to install the source within the borehole. This is a particular concern for a borehole that is utilized as part of a producing well, because accessing such a well requires that it be removed from production for the duration of a conventional BSEM survey. In addition, because electrical power is applied into the borehole, a safety analysis is required to control the risk of fire and other safety hazards. Such a safety analysis can require several months to obtain approval.

SUMMARY OF THE INVENTION

Briefly, the present invention provides a new and improved method for mapping the resistivity distribution of subsurface portions within the earth. According to the present invention, an electromagnetic source is deployed in a borehole, and an array of electric field sensors is deployed adjacent to the surface of the earth aligned radially to the borehole. An electromagnetic field is transmitted from the source at a first depth in the borehole, and an electromagnetic field is transmitted from the source at a second depth in the borehole. The transmitted electromagnetic fields from the source at the first depth and the second depth are measured with the deployed electromagnetic field sensors, and a ratio of the measured electromagnetic fields from the sensors obtained for source transmissions at the first and second depths. A measure of the resistivity at the sensors is then obtained based on the obtained ratio of measured electromagnetic fields from the sensors; and the resistivity distribution of the subsurface mapped from the obtained measures of resistivity at the sensors.

The present invention also provides a new and improved method for mapping the resistivity distribution within the earth. According to the method an electromagnetic source is deployed in a borehole, and an array of surface electric field sensors deployed radially with respect to the borehole. The sensors having sensors for sensing two axes of an electromagnetic field and positioned to measure electromagnetic fields along orthogonal axes. An electromagnetic field is transmitted from the electromagnetic source, and the transmitted electromagnetic field sensed with the surface field sensors of the deployed array. A measure of radial and tangential components of the sensed electromagnetic field at the surface field sensors is obtained along a tangential axis along which the sensed electromagnetic signal is minimal, and along a radial axis at a position orthogonal to the tangential axis. A measure of the resistivity at the sensors based on the based on the obtained measure of radial and tangential components of the sensed electromagnetic field at the surface field sensors is then obtained, and the resistivity distribution of the subsurface mapped from the obtained measures of resistivity at the sensors.

DETAILED DESCRIPTION OF THE PREFERRED EMBODIMENTS

Figure 1:
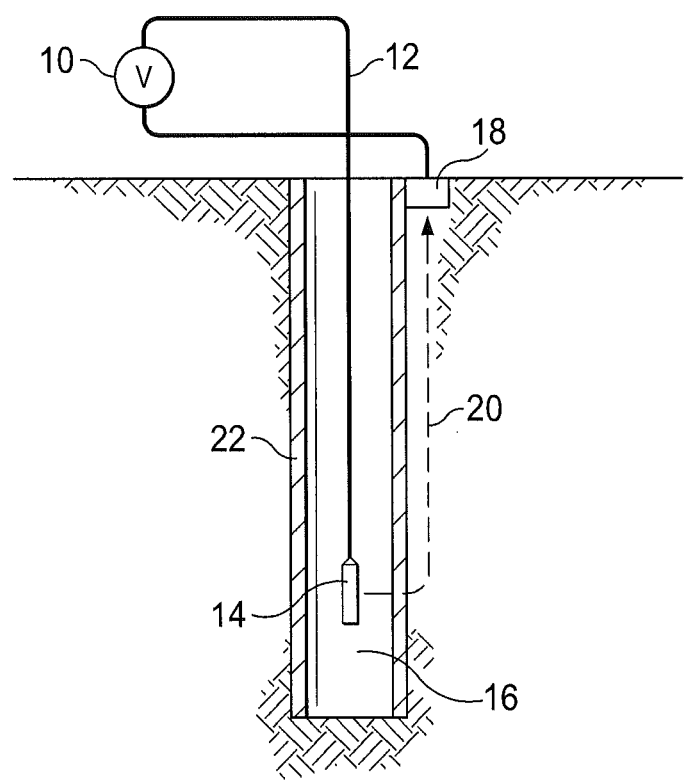
FIG. 1 is a schematic diagram of a prior art borehole to surface electromagnetic survey (or BSEM) survey being performed.

By way of further background, FIG. 1 illustrates an example of a type of conventional prior art BSEM survey. In FIG. 1, a source 10 is a powerful electromagnetic energy transmitter at the surface that generates an electric current in the earth of a desired waveform, for example a square wave of well defined fundamental frequency. The transmitter or source 10 is connected by a cable 12 to a source electrode 14 located at a depth of interest inside a borehole 16 extending into the subsurface containing formations or features of possible interest. The circuit for the flow of current from the transmitter 12 is completed by a counter electrode 18 at the surface near to the borehole 16.

Electric current flows as indicated schematically at 20 from the source electrode 14, through the earth and back through the counter electrode 18. If the borehole 16 has a conducting casing such as shown at 22, then the casing 22 acts as an electrical resistance in parallel with the resistivity of the earth between electrodes 14 and 18, and part of the source current flows along the casing 22.

As will be set forth, the present invention measures electric fields adjacent to the surface of the earth with sensors oriented in a specified relationship to a source placed in a borehole. The present invention enables the orientation of the electric field sensors to be effectively adjusted based upon the signal they receive from the borehole source, rather than requiring installation with respect to the coordinate system of the earth. In addition the present invention provides a channel of information that can be used to separate cultural interference from the primary measurement channel. The quality of the data is improved in this manner, and thus the present invention allows the source to be operated at lower power, thereby alleviating a perceived risk of accessing the borehole for survey purposes.

Figure 2:
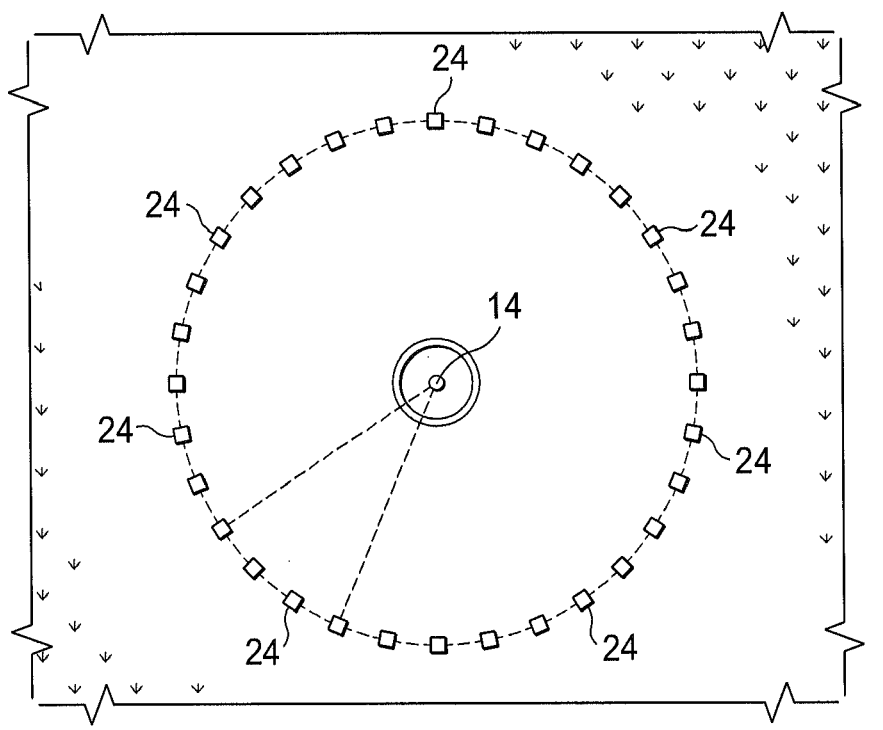
FIG. 2 is a plan view of deployment of a number of electromagnetic sensors deployed in a radial array at spaced locations from a wellbore for performing a BSEM survey.
Figure 3:
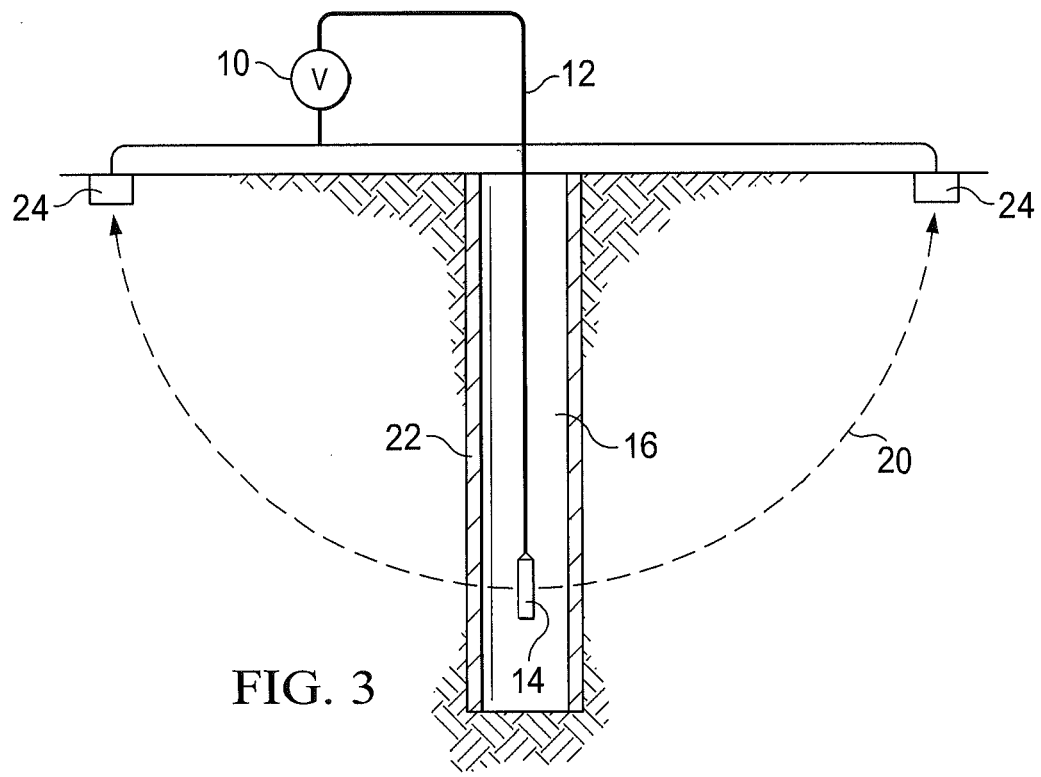
FIG. 3 is a schematic diagram of a BSEM survey being performed in accordance with the present invention.

In FIG. 2, another form of BSEM survey is illustrated. A number of sensing electrodes 24 are arranged radially about the borehole 16. Sensors used for the purposes of the present inventions may be either the type which are buried, or of the type which may simply be placed on the surface. The electrodes 24 measure the surface electric field transmitted from the borehole 16 by a source like that shown in FIG. 1 in order to measure the radial component of the BSEM electric field. The individual electrodes 24 are positioned by reference to the global positioning system (GPS) in absolute reference to the GPS location of the borehole. The electrodes are buried in holes excavated to approximate depth without modifying the local surrounding terrain.

This method of locating the electrodes by burying them at fixed locations can result in inaccuracies in measuring the true radial E-field due to the following adverse effects:

1. Errors in aligning the sensor axis to the true radial direction.
2. Distortion (attenuation or amplification) and rotation of the field at the sensors due to static shift effects.
3. Distortion of the potential at one or both measurement points due to errors in height.
4. Distortion of the field in the ground due to local surface roughness such as depressions.
5. In addition, a fifth cause of distortion arises because the electric potential coupled from the electrodes into the first stage of amplification in the measurement system is subject to variations in the buried electrode contact impedance to the earth.

These five types of measurement distortion are present at varying levels at each sensing location. The net effect is that the electric field, $E_m$, that is measured at each point (i.e., the value that is recorded by the data collection system) is a multiple, k, of the true radial electric field, $E_{tr}$. The value of k varies over a range from approximately 0.95 to 1.05 depending on how the sensor location is determined and the local variations in ground electrical properties. As a result, $E_m$ can vary by up to 10% between sensing locations, even if the true value of the field at the locations is actually the same.

In current BSEM practice, the measurement errors introduced by the effects described above and resulting in variations in the value of k have, so far as is known, been addressed by taking the difference between measured electric field values resulting from currents supplied from the source positioned at two different well depths. For example, in reservoir surveys, the standard practice is to take the difference of $E_m$ values for the source positioned at borehole depths above and below the oil reservoir.

The reasoning has been that the five causes of measurement error do not change when the source is moved and so the difference value is more reliable. Furthermore, the effect of taking the difference of surface readings for the source at different depths is as if a single source dipole of length equal to the difference in depths, and located at the average of the two depths, were used. Such a dipole source is far below the sensor array, leading to a belief that static shift effects are small. However, the net effect of taking the difference of two measured fields, $E_{m1}$ and $E_{m2}$, is that their difference still contains the surface measurement error multiplier, k. Specifically:

$$E_{m1} - E_{m2} = kE_{tr1} - kE_{tr2} = k(E_{tr1} - E_{tr2}) \quad (1)$$

Thus, the variation in the $E_m$ difference across measurement sites is actually the same as that for the fields themselves.

With the present invention, an improved methodology is provided to correct for surface related measurement errors and thus improve the measuring and mapping the electrical resistivity of the earth's subsurface. With the present invention, it has been found that by obtaining a ratio of the measured electromagnetic fields from the sensor locations of counter electrodes for source transmissions at two different source depths, specifically:

$$E_{m1}/E_{m2} = kE_{tr1}/kE_{tr2} = E_{tr1}/E_{tr2} \quad (2)$$

the effect of measured distortion on the E-field readings, which cumulatively indicated by the value of the variable k, can be removed from the E-field data of interest.

Figure 4:
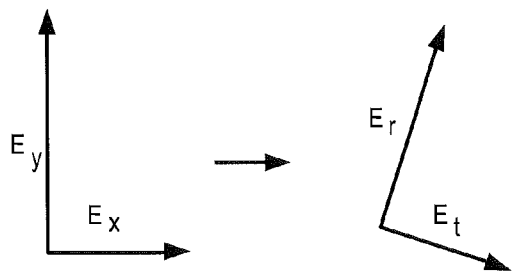
FIG. 4 is a schematic diagram of measurements of an electromagnetic field along and x-y axis and subsequent generation of radial and tangential electromagnetic fields according to the present invention.

Further, it has been found that variations in the value of k can also be taken into account in another feature of the present invention, which is to obtain measures of two components of the surface electric field. This feature does not require, but can still be utilized in conjunction with, operation of the source at multiple depths as described above. The methodology of this feature of the present invention takes advantage of the physical principle that in an isotropic uniform earth, the field produced by a borehole source is entirely radial to the source, and has no tangential component. Two nominally orthogonal components of the electric field are measured along axes $E_x$ and $E_y$, as indicated in FIG. 4. For convenience these axes can be oriented to the cardinal directions of the earth, i.e., north-south, and east-west, but this is not necessary, and other suitable pairs of orthogonal directions can be used. Also the orthogonality of the axes need not perfect, but may be assumed to be within acceptable limits of alignment accuracy discussed above.

When the source is active, a nominally radial electric field is produced in the earth. For simplicity, consider a case where the deviation from ideal radial orientation is due to inhomogeneities in the surface conductivity (i.e. static shift) and in the bulk conductivity of the deeper subsurface. In accordance with the present invention, the radial, $E_r$, and tangential, $E_t$, components of the field at the sensing location are synthesized from the components $E_x$ and $E_y$ measured at the sensors by defining $E_r$ and $E_t$ as the orthogonal set for which the tangential axis BSEM signal is minimum. Specifically the direction of $E_r$ relative to the axes defined by $E_x$ and $E_y$, that is the angle $\alpha$ between $E_r$ and the axis $E_x$, is given by the arctangent of the ratio $E_y/E_x$, i.e. $\tan \alpha = E_y/E_x$. The four vectors $E_x$, $E_y$, $E_r$, and $E_t$ are illustrated in FIG. 4. Note at the BSEM frequency, the length of the vector $E_t$ is defined to be zero, or at least to have its minimum value.

The effect of synthesizing $E_r$ by measurement of the source field instead of measuring $E_r$ by a sensor nominally aligned in a radial direction is to remove the effect of errors due to alignment (category 1 above). Alignment errors are likely to dominate the accuracy of the measurement and trying to obtain alignment accuracy to even ±2° is time consuming. By this method the sensor axes, $E_x$ and $E_y$, can be emplaced quickly with nominal orientation achieved by a handheld compass, and the spacing between sensors determined quickly and accurately by a simple tape measure or light based distance finder.

A further benefit of synthesizing measurement axes $E_r$ and $E_t$ is that by definition $E_t$ contains no BSEM signal, and so can serve as an interference and noise cancelling channel. This method is particularly powerful because the interference, $E_i$ and noise fields, $E_n$, are not aligned with either $E_r$ or $E_t$, but are present in both channels in a coherent manner. Thus a standard coherency based cancellation algorithm can be used to reduce noise and interference in the BSEM measurement channel, $E_r$, based on the information content represented by the data $E_t$.

A benefit of reducing noise and/or interference in the primary measurement channel $E_r$ is that the power that is transmitted by the source can be reduced. It is expected that the voltage applied in order to transmit the field at depth may be no more than 100 volts, and in some instances no more than 50 volts, and even no more than 30 volts. Reducing the power has the benefit that the cost of the transmitter is reduced, and furthermore that the peak voltage that is applied in the borehole is reduced. Reducing the peak voltage mitigates safety concerns associated with operating the source in the borehole and thereby reduces the setup cost of the survey.

Figure 5:
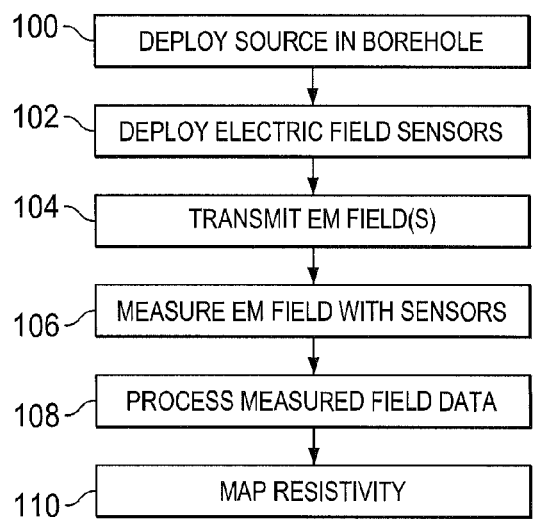
FIG. 5 is a schematic diagram illustrating the process of mapping resistivity distribution within the earth according to the present invention.

FIG. 5 illustrates the methodology or process of mapping resistivity distribution within the earth according to the present invention. As shown at step 100, the electromagnetic source electrode 14 is deployed in borehole 16, and at step 102 the array of electric field sensors 24 are deployed adjacent to the surface of the earth and aligned radially to the borehole 16 as shown in FIG. 2. During step 104, an electromagnetic field is transmitted from the source electrode 14 at a first depth in the borehole 16. The source electrode 14 is then moved to a second depth in the borehole and an electromagnetic field from the source electrode 14 at the second depth in the borehole. As indicated at step 106, the transmitted electromagnetic fields from the source electrode 14 at the first depth and the second depth in the borehole 16 are measured with the deployed electromagnetic field sensors 24.

The field data measured during step 106 are then processed during step 108. One of the types of processing during step 108 is obtaining a ratio $E_{m1}/E_{m2}$ of the measured electromagnetic fields from the sensors for source transmissions at the first and second depths, as discussed above with relation to Equation (1).

Another type of processing during step 108 is obtaining as discussed above with relation to Equation (2), a measure of radial and tangential components $E_r$ and $E_t$, respectively, of the sensed electromagnetic fields at the surface field sensors along a tangential axis, along which the sensed electromagnetic signal is minimal, and along a radial axis at a position orthogonal to the tangential axis.

During step 108 the measure of the resistivity at the sensors is obtained based on the based on the data obtained based on fields measured electromagnetic from the deployed sensors 24. For the electric field, the local electric potential $E_r$ measured between the sensor and the E field measured at wellbore 16 are determined. The difference between these measurements divided by the separation distance between the sensing locations indicates a measure of resistivity along the line of separation. During step 110, the resistivity distribution of the subsurface from the obtained measures of resistivity at the sensors is then mapped or displayed on a suitable computer display.

Figure 6:
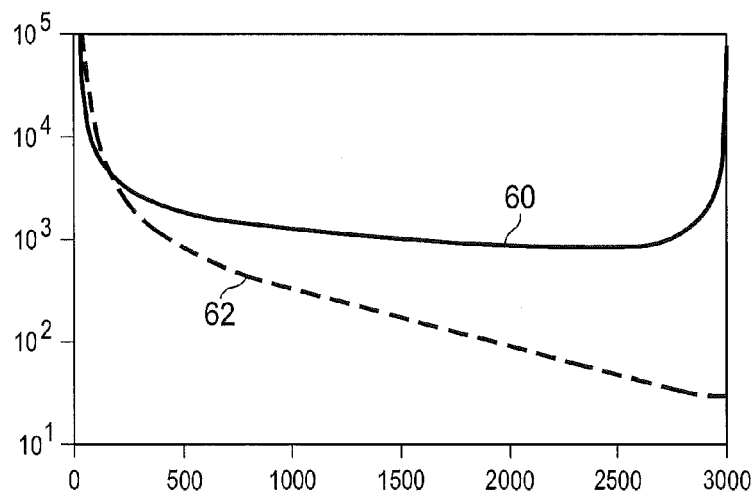
FIG. 6 is a graphical plot of data comparing surface E-fields for different survey methods.

FIG. 6 is a graphical plot of data comparing surface E-fields for different survey methods. In FIG. 6, a data plot or curve 60 illustrates a surface E-field as a function of radial distance from a source wellbore according to the present invention, while a data plot or curve 62 illustrates propagation with conventional BSEM surveying. The plot 62 shows that the field measured at the surface degrades with distance from the source electrode well. The plot 60 shows an even and uniform propagation of the field. The present invention thus allows reduced transmission power as mentioned, and increasing the depth of investigation. The present invention also allows a selective orientation of the transmitted field in the reservoir. Burying the counter electrodes in specific directions, or even in a nearby well.

As discussed above, a deviation from ideal radial orientation with respect to the borehole can be considered to be caused by a combination of inhomogeneities in the surface conductivity (i.e. static shift), and inhomogeneities in the bulk conductivity of the deeper subsurface. Of these two, the static shift has the greater effect because it is closer to the sensors, and in addition can vary due to weather and infrastructure modifications between surveys. A method to assess whether a significant static shift is occurring is to produce a field from a second borehole. If static shift or deeper inhomogeneities are not present, then the angle between the two synthesized radial E-field directions should equal the physical angle subtended from the sensor location to the two boreholes. If the angles differ, then the magnitude of the difference gives a measure of the amount of distortion occurring at the sensor location.

In accordance with the present invention, the present invention employs one or more of the controlled source EM methods described above, enabled by one or more EM sources located in one or more boreholes with an array of EM receivers adjacent to the ground surface, and is termed a borehole-to-surface electromagnetic (BSEM) survey.

From the foregoing, it can be seen that the present invention provides an improved BSEM method that enables an accurate array to be installed more quickly than previous approaches. The present invention also helps mitigate cultural EM interference, and alleviates the present concerns about operating a source inside a borehole. It is expected that the present invention should reduce the time needed to set up and acquire a BSEM survey, reducing costs and increasing the area that could be covered.

Applications of significant commercial and research interest for the present invention exist in a number of areas, including, for example: mapping hydrocarbon distribution in reservoirs undergoing gas or water injection, observing hydrofracture injection of fluids and slurries, monitoring fresh water storage and the geological integrity of reservoirs used for $CO_2$ sequestration, and extending conventional EM geophysical capabilities in mineral production from in-situ mining, acid mine drainage, contaminants, and groundwater assessment.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method for mapping the resistivity distribution within the earth with correction for alignment errors of surface electromagnetic field sensors used to obtain electromagnetic survey data, comprising the steps of:

deploying an electromagnetic source in a borehole;

deploying an array of the surface electromagnetic field sensors adjacent the surface of the earth radially around the borehole, the surface electromagnetic sensors having sensors for sensing an electromagnetic field along two orthogonal axes adjacent the earth's surface and positioned at a known orientation to measure electromagnetic fields along the orthogonal axes;

transmitting an electromagnetic field from the electromagnetic source, the transmitted electromagnetic field having a transmitted radial component and no transmitted tangential component;

sensing the transmitted electromagnetic field along the orthogonal axes of the sensors at the earth surface with the surface field sensors of the deployed array;

obtaining a measure of the sensed electromagnetic field along the orthogonal axes at the surface field sensors;

forming a measure of a ratio between the sensed electromagnetic fields along the orthogonal axes;

synthesizing a radial component of the transmitted electromagnetic field based on the ratio between the sensed electromagnetic field along the orthogonal axes to correct for alignment errors of the deployed surface electromagnetic field sensors;

obtaining a measure of the resistivity at the sensors based on the synthesized radial component of the sensed electromagnetic field at the surface field sensors; and mapping the resistivity distribution of the subsurface with correction for alignment errors of the surface electromagnetic fields sensors from the obtained measures of resistivity at the sensors.

2. The method of claim 1 wherein the known orientation of the axes of the orthogonal field sensors is determined by a magnetic compass.

3. The method of claim 1 wherein the orthogonal sensor axes of the field sensors are oriented in north-south and east-west directions.

4. The method of claim 1 wherein the separation between the electromagnetic field sensors is determined by a tape measure or optical distance measurement.

5. The method of claim 1 wherein the electromagnetic field sensors are installed at the sensing locations before the source is inserted into the borehole.

6. The method of claim 1 wherein the borehole casing is driven at a chosen electric potential in order to confirm adequate operation of the sensors before the source is inserted into the borehole.

7. The method of claim 1 wherein the voltage applied in order to transmit the field at depth is no more than 100 V.

8. The method of claim 1 wherein the voltage applied in order to transmit the field at depth is no more than 50 V.

9. The method of claim 1 wherein the voltage applied in order to transmit the field at depth is no more than 30 V.

10. The method of claim 1 wherein information in tangential axis components of the sensed electromagnetic field is used to cancel electromagnetic noise and or interference in the measured radial electric field.

11. The method of claim 1 wherein the step of deploying comprises the step of deploying a first electromagnetic source in a first borehole and a second electromagnetic source is located in a different borehole than the first borehole and further including the steps of:
  a) transmitting an electromagnetic field from the second electromagnetic source the transmitted electromagnetic field from the second electromagnetic source having a transmitted radial component and no transmitted tangential component;
  b) obtaining a measure of a radial component of the sensed electromagnetic field from the second electromagnetic source along the orthogonal axes at the surface field sensors;
  c) forming a measure of a ratio between the sensed electromagnetic field from the second electromagnetic source along the orthogonal axes;
  d) synthesizing a radial component of the transmitted electromagnetic field from the second electromagnetic source based on the ratio between the sensed electromagnetic field along the orthogonal axes to correct for alignment errors of the deployed surface electromagnetic field sensors; and
  e) comparing the synthesized radial component of the transmitted electromagnetic field from the first and second electromagnetic sources in order to measure distortion at the sensor location.

12. A method for mapping the resistivity distribution within the earth with correction for alignment errors of surface electromagnetic field sensors used to obtain electromagnetic survey data, comprising the steps of:

deploying an electromagnetic source in a borehole;

deploying a radial array of the surface electromagnetic field sensors at the surface of the earth around the borehole, the surface electromagnetic sensors having sensors for sensing an electromagnetic field along two orthogonal axes in a horizontal plane at the earth's surface and positioned at a known orientation to measure electromagnetic fields along the orthogonal axes;

transmitting an electromagnetic field from the electromagnetic source, the transmitted electromagnetic field having a transmitted component radial to the borehole and no transmitted tangential component;

sensing the transmitted electromagnetic field along the orthogonal axes of the sensors at the earth surface with the surface field sensors of the deployed array;

obtaining a measure of the sensed electromagnetic field along the orthogonal axes at the surface field sensors;

forming a measure of a ratio between the sensed electromagnetic fields along the orthogonal axes;

synthesizing a radial component of the transmitted electromagnetic field based on the ratio between the sensed electromagnetic fields along the orthogonal axes to correct for alignment errors of the deployed surface electromagnetic field sensors;

obtaining a measure of the resistivity at the sensors based on the synthesized radial component of the sensed electromagnetic field at the surface field sensors; and mapping the resistivity distribution of the subsurface with correction for alignment errors of the surface electromagnetic fields sensors from the obtained measures of resistivity at the sensors.

\* \* \* \* \*